US012726005B2

(12) United States Patent
Kim

(10) Patent No.: US 12,726,005 B2
(45) Date of Patent: Sep. 1, 2026

(54) SMART DISTRIBUTION BOARD COMPRISING MODULE EXPANSION DEVICE

(71) Applicant: LS ELECTRIC CO., LTD., Anyang-si (KR)

(72) Inventor: Bumyoul Kim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 262 days.

(21) Appl. No.: 18/294,464

(22) PCT Filed: Oct. 17, 2022

(86) PCT No.: PCT/KR2022/015720
§ 371 (c)(1),
(2) Date: Feb. 1, 2024

(87) PCT Pub. No.: WO2023/101209
PCT Pub. Date: Jun. 8, 2023

(65) Prior Publication Data
US 2024/0339816 A1 Oct. 10, 2024

(30) Foreign Application Priority Data
Nov. 30, 2021 (KR) ........................ 10-2021-0167951

(51) Int. Cl.
*H02B 1/00* (2006.01)
*H02B 1/04* (2006.01)
*H02B 1/24* (2006.01)

(52) U.S. Cl.
CPC ............... *H02B 1/24* (2013.01); *H02B 1/041* (2013.01)

(58) Field of Classification Search
USPC .......................................................... 361/631
See application file for complete search history.

(56) References Cited

U.S. PATENT DOCUMENTS 10,028,403 B1 * 7/2018 Hartman ................ H05K 7/142
10,499,525 B1 * 12/2019 Singh ....................... H05K 5/03
(Continued)

FOREIGN PATENT DOCUMENTS

JP 2021082028 A 5/2021
KR 2019990006714 U 2/1999
(Continued)

OTHER PUBLICATIONS

International Search Report for related International Application No. PCT/KR2022/015720; action dated Jun. 8, 2023; (2 pages).
(Continued)

*Primary Examiner* — Zhengfu J Feng
(74) *Attorney, Agent, or Firm* — K&L Gates LLP

(57) ABSTRACT

A smart distribution board according to an embodiment of the present disclosure comprises a module expansion device mounted on each of a plurality of modules and connecting the plurality of modules with each other, wherein the module expansion device comprises: a PCI slot for connecting the module of the plurality of modules, on which the module expansion device is mounted; and at least one expansion connector for connecting the module on which the module expansion device is mounted and at least another module.

7 Claims, 3 Drawing Sheets

(56) References Cited

U.S. PATENT DOCUMENTS

| | | | | |
|---|---|---|---|---|
| 2007/0223160 | A1* | 9/2007 | Coffey ................. | H05K 7/1457 361/62 |
| 2021/0232694 | A1* | 7/2021 | Jannyavula Venkata .................... | H04L 9/0897 |

FOREIGN PATENT DOCUMENTS

| | | | | |
|---|---|---|---|---|
| KR | 20140022313 | A | | 2/2014 |
| KR | 101597096 | B1 | | 2/2016 |
| KR | 20200081088 | A | | 7/2020 |
| KR | 20200099884 | A | | 8/2020 |
| TW | M422073 | U | * | 2/2012 |

OTHER PUBLICATIONS

Written Opinion for related International Application No. PCT/KR2022/015720; action dated Jun. 8, 2023; (4 pages).

Notice of Allowance for related Korean Application No. 10-2021-0167951; action dated Nov. 2, 2023; (2 pages).

Office Action for related Korean Application No. 10-2021-0167951; action dated May 23, 2023; (4 pages).

* cited by examiner

SMART DISTRIBUTION BOARD COMPRISING MODULE EXPANSION DEVICE

CROSS-REFERENCE TO RELATED APPLICATIONS

This application is the National Stage filing under 35 U.S.C. 371 of International Application No. PCT/KR2022/015720, filed on Oct. 17, 2022, which claims the benefit of earlier filing date of and rights of priority to Korean Application 10-2021-0167951, filed on Nov. 30, 2021, the contents of which are all hereby incorporated by reference herein in their entirety.

FIELD

The present disclosure relates to a smart distribution board.

BACKGROUND

Recently, as the fourth industry has been an issue, it has become a trend to streamline work structures by giving IoT functions to electronic devices.

A distribution board (or switchboard) generally performed a simple function of directly controlling a circuit breaker by monitoring internal modules such as a digital output (DO) module, but as IoT became more common, it was necessary to perform more requirements. For example, there is a need to not only monitor the temperature of the distribution board and current and voltage, but also load information related to devices that communicate through RS 485 to top.

In addition, since there are spatial constraints due to the nature of the distribution board, it is difficult to install a temperature collection device, an energy collection device that collects current and voltage, and a converter for RS 485 communication or Ethernet communication. Moreover, the type and number of modules required for the distribution board vary depending on an industrial site where the distribution board is installed, and it is difficult to flexibly deal with this when mass-produced.

Therefore, there is a need to develop a smart distribution board that can overcome spatial constraints while performing various IoT functions.

SUMMARY

One aspect of the present disclosure is to provide a smart distribution board that performs IoT functions without separately installing devices for various IoT functions in the distribution board.

Another aspect of the present disclosure is to provide a smart distribution board that can overcome spatial constraints thereof without separately installing devices for various IoT functions in the distribution board.

Still another aspect of the present disclosure is to provide a smart distribution board that can flexibly deal with difficulties in utilizing the smart distribution board by simply coupling necessary modules depending on an industry to which the smart distribution board is applied.

Solution to Problem

To achieve these and other advantages and in accordance with the purpose of the present disclosure, as embodied and broadly described herein, there is provided a smart distribution board including a module expansion device mounted on each of a plurality of modules to connect the plurality of modules to each other, wherein the module expansion device includes: a Peripheral Component Interconnect (PCI) slot that connects a module equipped with the module expansion device among the plurality of modules; and at least one expansion connector that connects the module equipped with the module expansion device and at least one another module.

The module expansion device may include a switch that assigns a prefix to each of the plurality of modules.

The plurality of modules each may include a main module and at least one sub-module, and the main module may include: a communication unit; and a processor that receives status information related to the smart distribution board through at least one of the communication unit and the module expansion device, transmits the status information to an external device through the communication unit, and controls the at least one sub-module based on monitoring information corresponding to the status information, received from the external device.

The smart distribution board may further include at least one sensing device that detects the status of the smart distribution board, and the processor may receive first status information related to the smart distribution board detected by the sensing device through the communication unit, and receive second status information related to the at least one sub-module through the module expansion device.

The communication unit may include a first Radio Frequency (R)) module and a second RF module that receive RF signals of different frequencies, and the processor may receive the first status information related to the smart distribution board through the first RF module or the second RF module corresponding to the sensing device.

The module expansion device may include a switch that assigns a prefix to the at least one sub-module, and the processor may distinguish the at least one sub-module based on the prefix assigned through the switch.

The main module may further include a memory, and the processor may identify control information for controlling the at least one sub-module based on the monitoring information, and store the control information and information related to time at which the control information has been identified in the memory.

The processor may sequentially process the control information based on the information related to the time at which the control information has been identified.

According to an embodiment of the present disclosure, information related to IoT-based devices or modules used within a smart distribution board can be efficiently collected and spatial constraints can be solved by implementing a main module to serve as a single gateway as well as accommodating IoT functions.

According to one embodiment of the present disclosure, a main module can flexibly cope with spatial constraints of a distribution board by wirelessly collecting information from sensing devices, and can secure safety through redundancy by including a function of converting RS 485 communication to Ethernet communication and supporting Ethernet RSTP.

According to one embodiment of the present disclosure, a type or number of modules constituting a smart distribution board may be adjusted depending on situations by connecting modules through module expansion devices. In addition, if one module is broken, only the broken module can be detached and repaired or replaced with a new module.

Therefore, it is economical because there is no need to set a separate smart distribution board.

DETAILED DESCRIPTION

Figure 1:
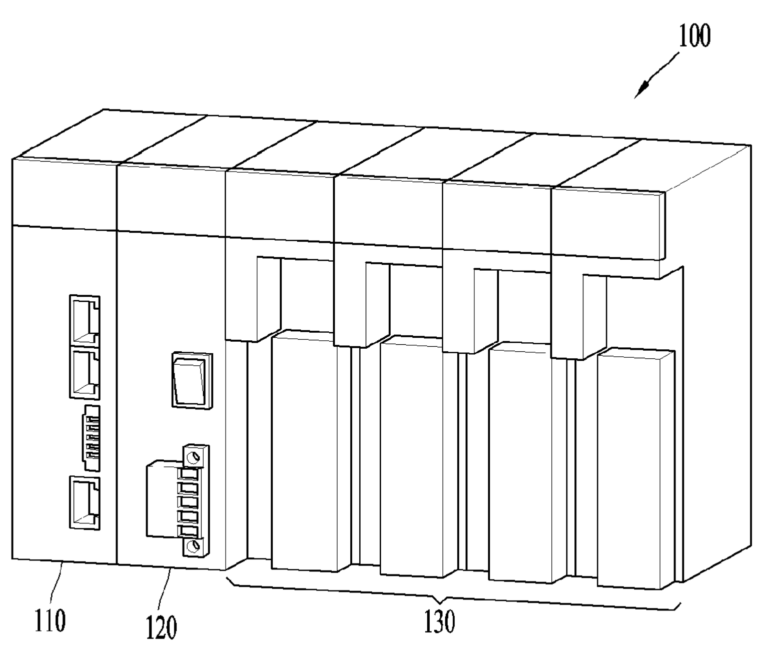
FIG. 1 is a view illustrating a smart distribution board in accordance with one embodiment of the present disclosure.

Hereinafter, preferred embodiments according to the present disclosure will be described in detail with reference to the attached drawings. The detailed description set forth below with the accompanying drawings is intended to illustrate exemplary embodiments of the invention and is not intended to represent the only embodiments in which the invention may be practiced. In order to clearly explain the present disclosure in the drawings, parts unrelated to the description will be omitted, and the same or equivalent reference numerals will be used for the same or equivalent components throughout the description.

FIG. 1 is a view illustrating a smart distribution board in accordance with one embodiment of the present disclosure.

FIG. 1 illustrates a smart distribution board 100 including a main module 110, a power module 120, and a plurality of sub-modules 130. The smart distribution board 100 according to the present disclosure may not be limited by the components or the order of coupling the components, and addition or deletion of components of the smart distribution board 100 may be needed depending on embodiments.

The main module 110 serves to control the status of the smart distribution board 100 by collecting information related to the status of the smart distribution board 100 from the plurality of sub-modules 130 or IoT-based sensing devices such as a temperature collection device, an energy collection device, etc. and determining the status of the smart distribution board 100 based on the collected information. More specific details about the main module 110 will be described with reference to FIG. 2.

The power module 120 includes a power supply device such as a Switching Mode Power Supply (SMPS) and serves to supply power to the main module 110 and the plurality of sub-modules 130.

The plurality of sub-modules 130 refer to modules that are built in the smart distribution board 100 and provide status information to the main module 110 or are controlled by the main module 110 according to the status of the smart distribution board 100. The plurality of sub-modules 130 include, for example, a Digital Input (DI) module, a Digital Output (DO) module, an Analog Input (AI) module, an Analog Output (AO) module, and the like.

According to one embodiment of the present disclosure, the main module 110, the power module 120, and the plurality of sub-modules 130 may be connected to one another through module expansion devices. The module expansion device is mounted on each module and serves to connect one module to another module. According to one embodiment of the present disclosure, the type or number of modules constituting the smart distribution board 100 may be adjusted depending on situations by way of connecting modules through the module expansion devices. More detailed information related to the module expansion device will be described in relation to FIG. 3.

The smart distribution board 100 according to the present disclosure is intended to solve spatial constrains by efficiently collecting information related to IoT-based devices or modules used within the smart distribution board 100 and implementing the main module 110 to serve as a single gateway as well as accommodating the function. Hereinafter, each component will be described in more detail.

Figure 2:
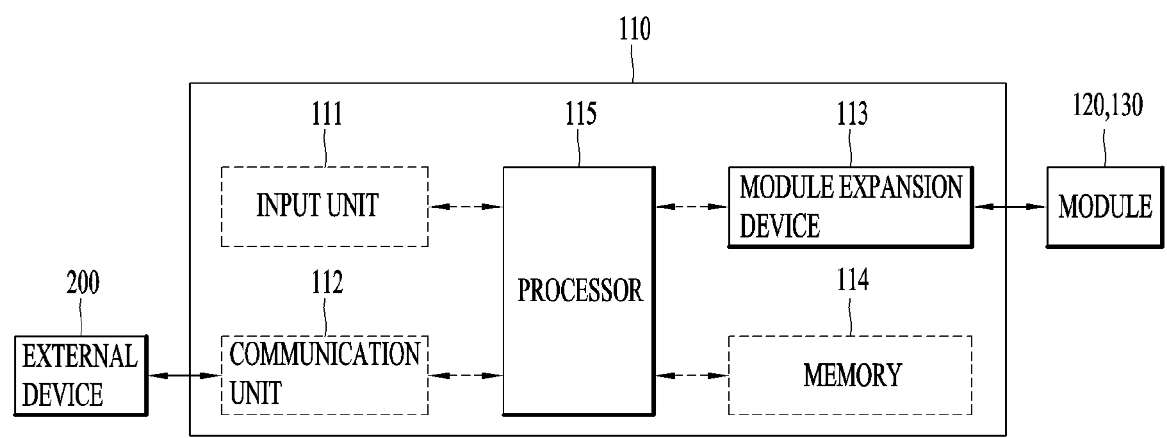
FIG. 2 is a block diagram illustrating a configuration of a main module of a smart distribution board accordance with one embodiment of the present disclosure.

FIG. 2 is a block diagram illustrating a configuration of a main module of a smart distribution board accordance with one embodiment of the present disclosure.

The main module 110 of the smart distribution board includes an input unit 111, a communication unit 112, a module expansion device 113, a memory 114, and a processor 115.

The input unit 111 may include a connector for connecting lower RS 485 communication devices such as MLINK controlling Smart MCCB as a smart circuit breaker, MCB, and MCCB, and the like, or a mounting portion for mounting a communication module disposed inside the main module 110.

The communication unit 112 may include wired/wireless communication modules that can perform communications between the main module 110 and an external device such as Supervisory Control And Data Acquisition (SCADA) or Human Machine Interface (HMI), between the main module 110 and the sub-modules 130, between the main module 110 and a sensing device, and between the main module 110 and a circuit breaker.

The wired communication modules include, for example, an RS 485 communication module, an Ethernet communication module, and a Local Area Network (LAN) communication module. According to one embodiment of the present disclosure, the Ethernet communication module supports Ethernet Rapid Spanning Tree Protocol (RSTP).

The wireless communication modules may include, for example, an RF module, a cellular communication module, a short-range wireless communication module such as Bluetooth or Wi-Fi, a Global Navigation Satellite System (GNSS) communication module, and the like.

At this time, in the case of a temperature collection device and an energy collection device among sensing devices, the communication unit 112 may include a first RF module and a second RF module that receive RF signals of different frequencies in order to prevent confusion due to different protocols.

The communication unit 112 may further include a converter that converts RS 485 communication to Ethernet communication.

The module expansion device 113 is mounted not only on the main module 110 but also on the power module 120 and the plurality of sub-modules 130. Referring to FIG. 1, the module expansion device 113 mounted on the main module 110 113 may physically connect the main module 110 and the power module 120. The detailed configuration of the module expansion device 113 will be described with reference to FIG. 3.

The memory 114 stores operation programs of the smart distribution board 100. The memory 114 includes a non-volatile storage that can preserve data (information) regardless of whether power is supplied, and a volatile memory that data to be processed by the processor 115 is loaded and data cannot be preserved when power is not supplied. Examples of the storage include a flash memory, Hard-Disc Drive (HDD), Solid-State Drive (SSD), Read Only Memory (ROM), etc., and examples of the memory include a buffer, a Random Access Memory (RAM), etc.

The memory 114 may store monitoring information received from an external device 200, or store status information received from the plurality of sub-modules 130, the circuit breaker, etc., control information generated based on the monitoring information, and time information related to the time when the control information is generated. Additionally, the memory 114 may store information related to a model learned to control at least one sub-module 130 based on monitoring information corresponding to status information received from the external device 200.

The processor 115 may execute software, such as a program, to control at least one another component (e.g., hardware or software component) of the smart distribution board 100 or execute various data processing or calculations.

When the external device 200 requests for status information, the processor 115 may transmit the status information received from the sensing device to the external device 200. The processor 115 may be connected to the lower RS 485 communication device and may request and receive data from the lower RS 485 communication device through the Ethernet module.

The processor 115 may sequentially manage abnormal situations that have occurred, by using the control information and the time information related to the time when the control information has been generated, which are stored in the memory 114.

The processor 115 may receive status information regarding the smart distribution board 100 through at least one of the communication unit 112 and the module expansion device 113, transmit the received status information to the external device through the communication unit 112, and perform at least one of analysis, processing, and result information generation with respect to data for controlling at least one sub-module 130 based on monitoring information corresponding to the status information received from the external device 200 by using at least one of machine learning, neural network, or deep learning which is a rule-based or artificial intelligence algorithm.

Figure 3:
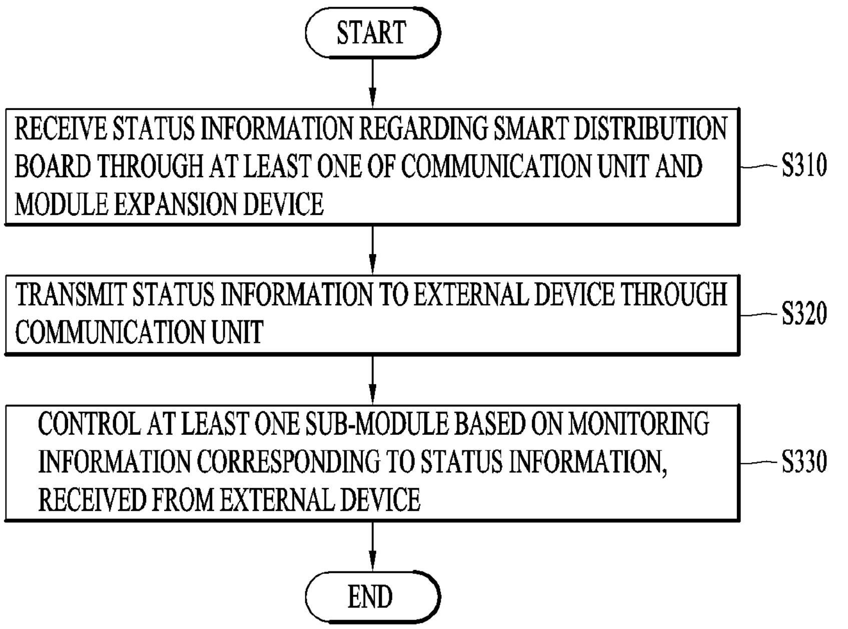
FIG. 3 is a flowchart illustrating operations of a main module of a smart distribution board accordance with one embodiment of the present disclosure.

FIG. 3 is a flowchart illustrating operations of a main module of a smart distribution board accordance with one embodiment of the present disclosure.

According to one embodiment of the present disclosure, the processor 115 may receive status information related to the smart distribution board 100 through at least one of the communication unit 112 and the module expansion device 113 (S310).

More specifically, the processor 115 may receive status information related to the smart distribution board 100 through the communication unit 112. The processor 115 may wirelessly receive the status information from a sensing device through the wireless communication module of the communication unit 112.

The sensing device according to one embodiment of the present disclosure may be a temperature collection device that detects the temperature of the smart distribution board 100, an energy collection device that detects a current or voltage flowing in the smart distribution board 100, or a humidity collection device that detects humidity, but is not limited to the type and number.

For example, the processor 115 may receive first state information related to the smart distribution board 100 through a first RF module or a second RF module corresponding to the sensing device. At this time, the first state information may include temperature data when received from the temperature collection device, and current data or voltage data when received from the energy collection device.

As described above, in order to receive the status information from the temperature collection device and the energy collection device, the communication unit 112 may include RF modules, and an RF module may be provided for each sensing device. Accordingly, the processor may receive the status information through a module corresponding to a sensing device. At this time, by setting different reception communication channels for each RF module, crosstalk can be reduced during wireless communication with the plurality of RF modules.

According to one embodiment of the present disclosure, the processor 115 may receive second status information from at least one sub-module 130 connected through the module expansion device 113. At this time, the second status information may include information representing the status of the distribution board in the form of an analog signal of a specific value or information representing the status of the circuit breaker in the form of an ON/OFF digital signal.

According to one embodiment of the present disclosure, the processor 115 may transmit the received status information to the external device 200 through the communication unit 112 (S320). At this time, the processor 115 may transmit the status information according to a signal transmitted from the external device 200 to request for transmission of the status information.

According to one embodiment of the present disclosure, the external device 200 is a higher-level monitoring device and includes a computer system that monitors and controls work processes based on industrial facilities such as SCADA.

The smart distribution board 100 according to one embodiment of the present disclosure serves as a remote terminal unit in a smart distribution board system, and convert signals, which are collected through communication with sensors installed in industrial facilities into computer-readable digital data, and transmit the converted data to the external device 200.

The external device 200 may generate monitoring information so that appropriate measures can be taken on the smart distribution board 100 according to the risk or possibility of numerous accidents, such as arc discharge, short circuit due to deterioration, and condensation, etc. which may occur in the smart distribution board 100. The monitoring information includes control information regarding a control that may be taken on the smart distribution board 100 based on the collected status information.

According to one embodiment of the present disclosure, the processor 115 may control at least one sub-module 130 based on monitoring information corresponding to the status information, received from the external device 200 (S330).

For example, when the processor 115 identifies the occurrence of an error in the smart distribution board 100 based on the monitoring information, the processor 115 controls the digital output (DO) module to short a specific circuit part, thereby cutting off power.

However, the present disclosure is not limited to this, and the processor 115 may control a circuit breaker or a sub-module based on the status information received from a sensing device or at least one sub-module 130.

The processor 115 may receive monitoring information corresponding to the status information from the external device 200. At this time, the processor 115 may receive the monitoring information from the external device 200 using modbus and DNP protocols.

According to one embodiment of the present disclosure, the main module 110 may flexibly cope with spatial constraints of the distribution board by wirelessly collecting information from sensing devices, and may secure safety through redundancy by including the function of converting RS-485 communication to Ethernet communication and supporting Ethernet RSTP.

Figure 4:
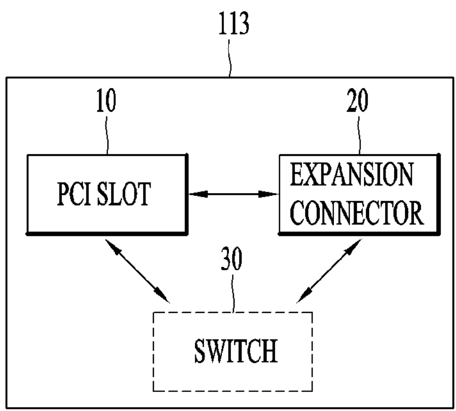
FIG. 4 is a block diagram illustrating a configuration of a module expansion device of a smart distribution board accordance with one embodiment of the present disclosure.

FIG. 4 is a block diagram illustrating a configuration of a module expansion device of a smart distribution board accordance with one embodiment of the present disclosure.

Referring to FIG. 4, the module expansion device 113 of the smart distribution board 100 includes a Peripheral Component Interconnect (PCI) slot 10, an expansion connector 20, and a switch 30.

The module expansion device 113 is mounted on each of a plurality of modules including the main module 110, the power module 120, and the plurality of sub-modules 130, and connects the plurality of modules to each other. The module expansion device 113 may be implemented in the form of Printed Circuit Board (PCB).

According to one embodiment of the present disclosure, the PCI slot 10 connects modules each equipped with the module expansion device 113. For example, the main module 110 is connected to the PCI slot 10 of the module expansion device 113 mounted on the main module 110.

According to one embodiment of the present disclosure, the module expansion device 113 includes at least one expansion connector 20 that connects a module equipped with the module expansion device 113 and at least one another module.

According to one embodiment of the present disclosure, the expansion connector 20 may connect the module connected through the PCI slot 10 and another module. The expansion connector 20 may have at least one connector depending on locations of modules. At this time, the modules connected through the expansion connector 20 may perform RS 485 communication.

Referring to the smart distribution board 100 of FIG. 1, for example, the expansion connector 20 of the module expansion device 113 mounted on the main module 110 connects the power module 120 and the main module 110. Therefore, one connector is provided. As another example, the expansion connector 20 of the module expansion device 113 mounted on the power module 120 connects the power module 120 to the main module 120 or the power module 120 to the sub-module 130. Therefore, two connectors are provided.

According to one embodiment of the present disclosure, the module expansion device 113 includes a switch 30 that assigns a prefix to each of a plurality of modules. More specifically, the plurality of sub-modules 130 include a switch 30 for communication between the plurality of sub-modules 130 or for distinctive communication between the main module 110 and each of the plurality of sub-modules 130. At this time, the switch 30 may assign the prefix in hardware using a piano switch or a rotary switch, but is not limited thereto and may alternatively assign the prefix in software. The processor 115 of the main module 110 may distinguish at least one sub-module 130 through the prefix assigned through the switch 30.

At this time, the modbus protocol may be used for the communication between the plurality of sub-modules 130, and data may be read out from four modules per second at a 250 ms cycle.

According to one embodiment of the present disclosure, the type or number of modules constituting the smart distribution board 100 may be adjusted depending on situations by connecting modules through the module expansion devices. In addition, if one module is broken, only the broken module can be detached and repaired or replaced with a new module. Therefore, it is economical because there is no need to set a separate smart distribution board.

Figure 5:
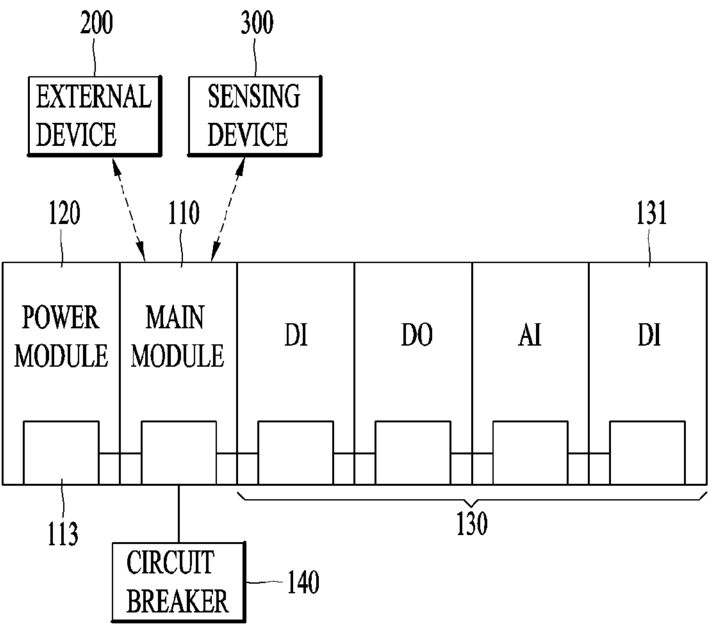
FIG. 5 is a view illustrating a smart distribution board in detail in accordance with one embodiment of the present disclosure.

FIG. 5 is a view illustrating a smart distribution board in detail in accordance with one embodiment of the present disclosure.

FIG. 5 is a diagram illustrating an example of a smart distribution board based on the description given with reference to FIGS. 1 to 4. The smart distribution board 100 of FIG. 5 includes a main module 110, a power module 120, a plurality of sub-modules 130, and a circuit breaker 140. The smart distribution board 100 receives status information from a sensing device 300 and the plurality of sub-modules 130, and transmits the status information to the external device 200, which is a higher-level monitoring system. The smart distribution board 100 controls the circuit breaker 140 or at least one sub-module 130 based on monitoring information corresponding to the status information, received from the external device 200.

At this time, according to one embodiment of the present disclosure, since the modules are connected through the module expansion devices 113, the type or number of modules constituting the smart distribution board 100 can be adjusted by using the module expansion devices 113 depending on the current situations of industrial facilities.

For example, the smart distribution board 100 according to one embodiment of the present disclosure includes one more digital input (DI) module 131 to reflect the situation of an industrial site where the smart distribution board 100 is installed. This can expand AI and AX contact capacities. As another example, when an additional analog input (DI) module is provided, various sensors can be more disposed, and when an additional digital output (DO) module is provided, the circuit breaker 140 can be forcibly controlled (tripped/closed).

The smart distribution board 100 according to one embodiment of the present disclosure can implement a gateway function of the main module 110 by connecting the main module 110 to the external device 200, the Ethernet communication module, the RS 485 communication module, the RF module communicating with a sensing device, the lower RS 485 communication device, or the like, and implement various combinations by using separation of the sub-modules 130, thereby flexibly coping with the limitation on spatial constraints.

DESCRIPTION OF REFERENCE NUMERALS

10: PCI slot
20: Expansion connector
30: Switch
100: Smart distribution board
110: Main module
111: Input unit
112: Communication unit
113: Module expansion device
114: Memory
115: Processor

120: Power module

130: Sub-module

The invention claimed is:

1. A smart distribution board comprising a module expansion device equipped on one module of a plurality of modules to connect the plurality of modules to each other, wherein the module expansion device comprises:

a Peripheral Component Interconnect (PCI) slot that connects the module expansion device with the one module equipped with the module expansion device among the plurality of modules; and at least one expansion connector that connects the one module equipped with the module expansion device with at least one other module of the plurality of modules, wherein the plurality of modules comprises a main module and at least one sub-module, and wherein the main module comprises:

a communication unit; and a processor that is configured to:

receive status information related to the smart distribution board through at least one of the communication unit and the module expansion device, transmit the status information to an external device through the communication unit, and control the at least one sub-module based on monitoring information corresponding to the status information, received from the external device.

2. The smart distribution board of claim 1, wherein the module expansion device comprises a switch that assigns a prefix to each module of the plurality of modules.

3. The smart distribution board of claim 1, further comprising at least one sensing device that detects a status of the smart distribution board, wherein the processor is further configured to:

receive first status information related to the smart distribution board detected by the at least one sensing device through the communication unit, and receive second status information related to the at least one sub-module through the module expansion device.

4. The smart distribution board of claim 3, wherein the communication unit comprises a first Radio Frequency (RF) module and a second RF module that are configured to receive RF signals of different frequencies, and wherein the processor is further configured to receive the first status information related to the smart distribution board through the first RF module or the second RF module corresponding to the at least one sensing device.

5. The smart distribution board of claim 1, wherein the module expansion device comprises a switch that assigns a prefix to the at least one sub-module, and wherein the processor is further configured to distinguish the at least one sub-module based on the prefix assigned through the switch.

6. The smart distribution board of claim 1, wherein the main module further comprises a memory, wherein the processor is further configured to:

identify control information for controlling the at least one sub-module based on the monitoring information, and store the control information and information related to a time at which the control information has been identified in the memory.

7. The smart distribution board of claim 6, wherein the processor is further configured to sequentially process the control information based on the information related to the time at which the control information has been identified.

* * * * *